Figure 16:
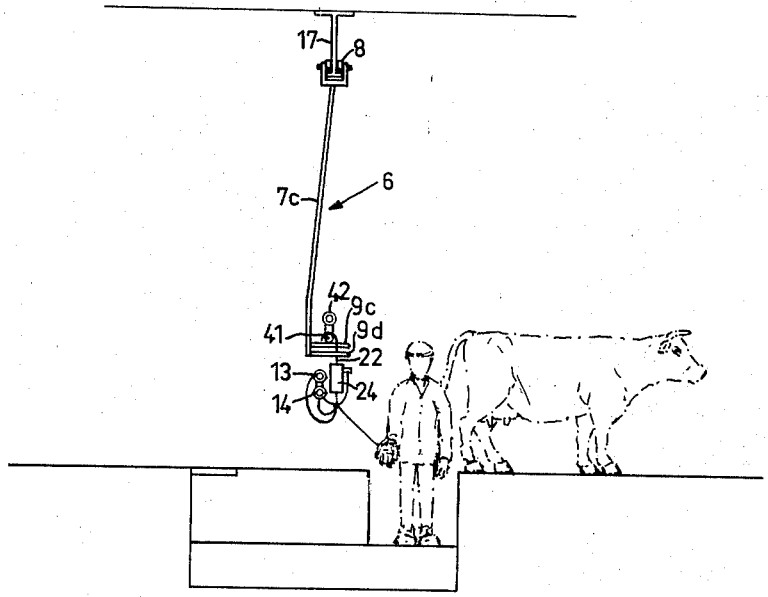

United States Patent
Janson et al.

[15] 3,683,856
[45] Aug. 15, 1972

[54] MILKING INSTALLATION FOR COW STABLES

[72] Inventors: Stig Janson; Ulf Stig Janson, both of Ryholms Gods, Moholm, Sweden

[22] Filed: Dec. 15, 1969

[21] Appl. No.: 885,097

[52] U.S. Cl. ............................................. 119/14.11
[51] Int. Cl. ......................... A01j 05/00, A01j 09/08
[58] Field of Search ...................... 119/14.11, 14.03

[56] References Cited

UNITED STATES PATENTS

| | | | |
|---|---|---|---|
| 1,494,138 | 5/1924 | Shippert et al. | 119/14.11 |
| 3,402,699 | 9/1968 | Cain | 119/14.11 X |

FOREIGN PATENTS OR APPLICATIONS

| | | |
|---|---|---|
| 138,758 | 9/1950 | Australia |

*Primary Examiner*—Hugh R. Chamblee
*Attorney*—Young and Thompson

[57] ABSTRACT

A milking installation for the milking of cows, more or less permanently installed in rows of stalls, wherein milking members to be applied to the teats of the cows are connected or connectible to a milk pipe and a vacuum pipe and supported by a carriage, which is movable along milking stations at each stall, the milking members being movable along guideways on the carriage, so as to remain motionless relatively to the milking stations during milking and to move back from the rear end of the carriage to the forward end for renewed adaptation to the teats of further cows during the motion of the carriage along the row of milking stations. The invention comprises also means to perform most of the movements and connecting and release operations automatically so that the main occupation of an operator is to place the teat cups in position on the udders of the cows. The guideway for the milking members on the carriage can be either a closed endless track, one or more movable chains, etc. or only a return track for the milking members during their motion from the rear end to the forward end of the carriage.

6 Claims, 21 Drawing Figures

PATENTED AUG 15 1972
3,683,856
SHEET 1 OF 6
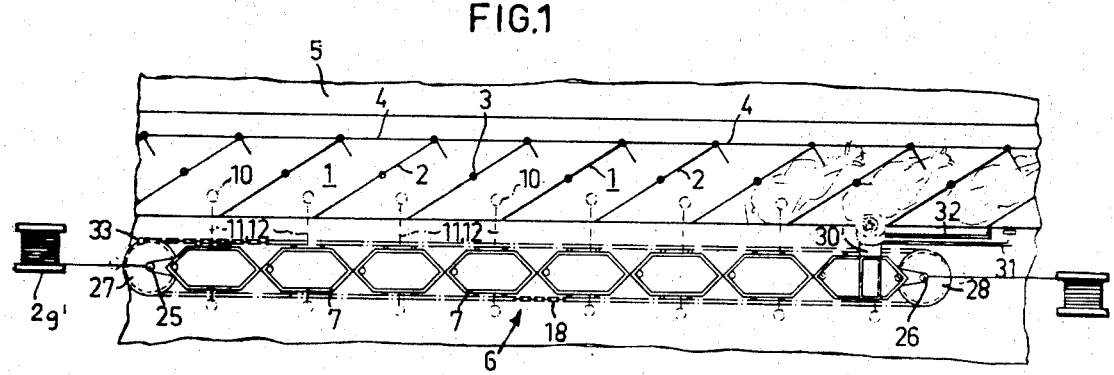
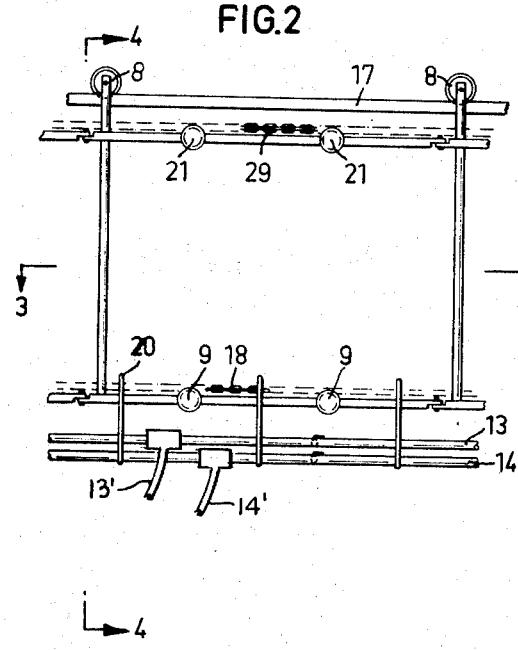
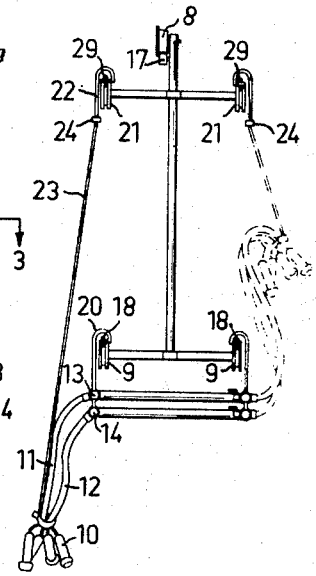
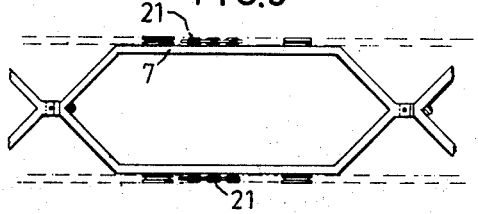
STIG JANSON
ULF STIG JANSON
INVENTORS
BY Young + Thompson
ATTYS

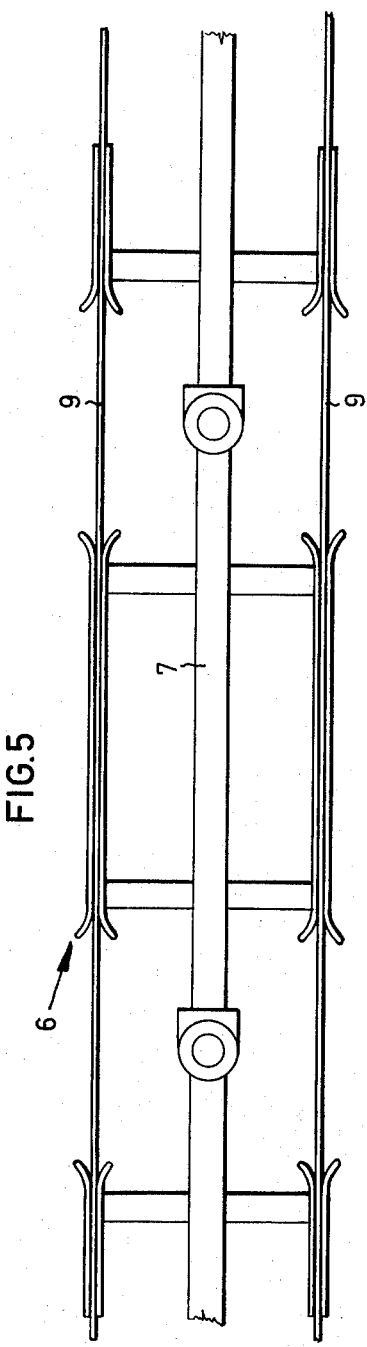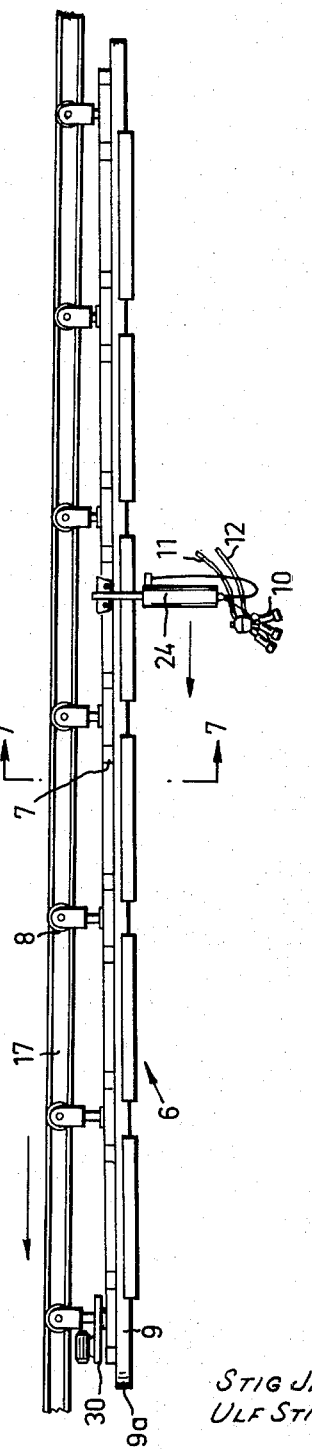

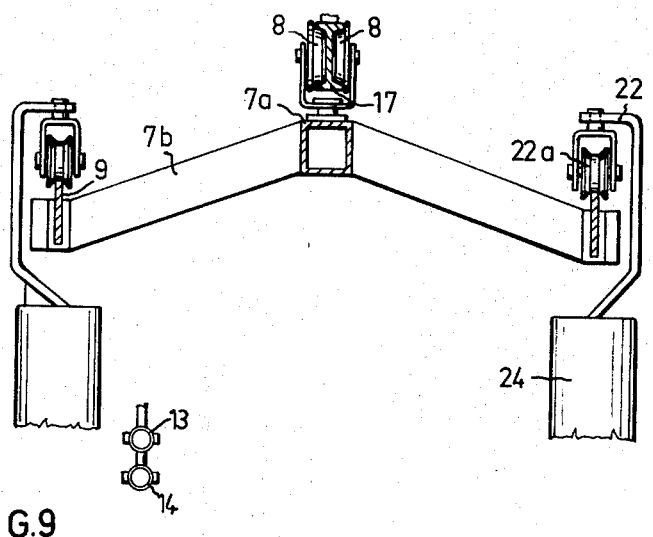
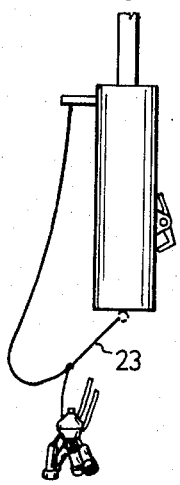
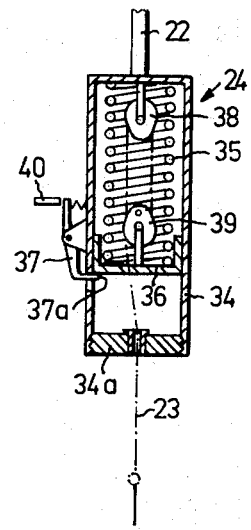
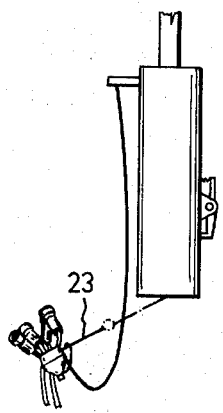

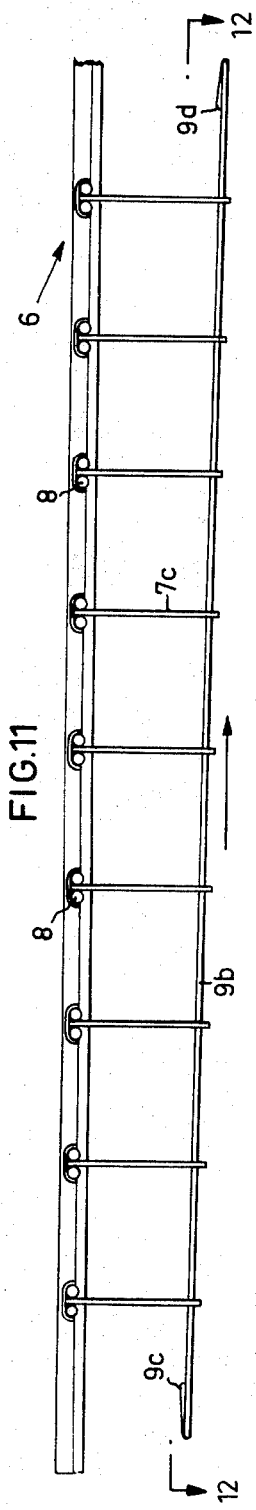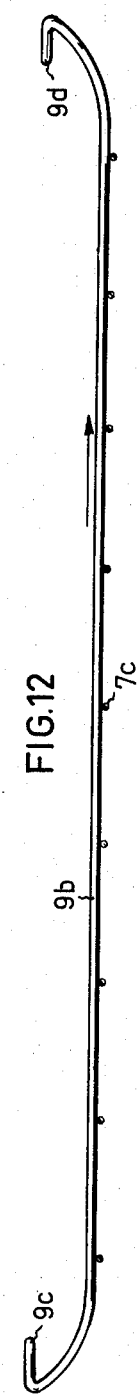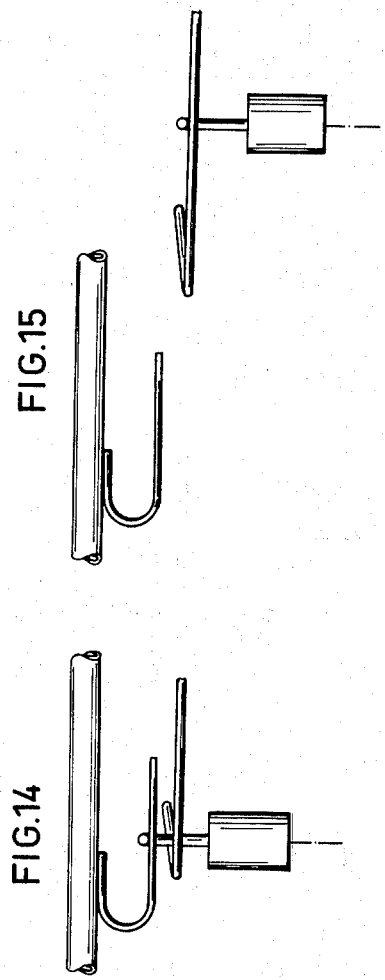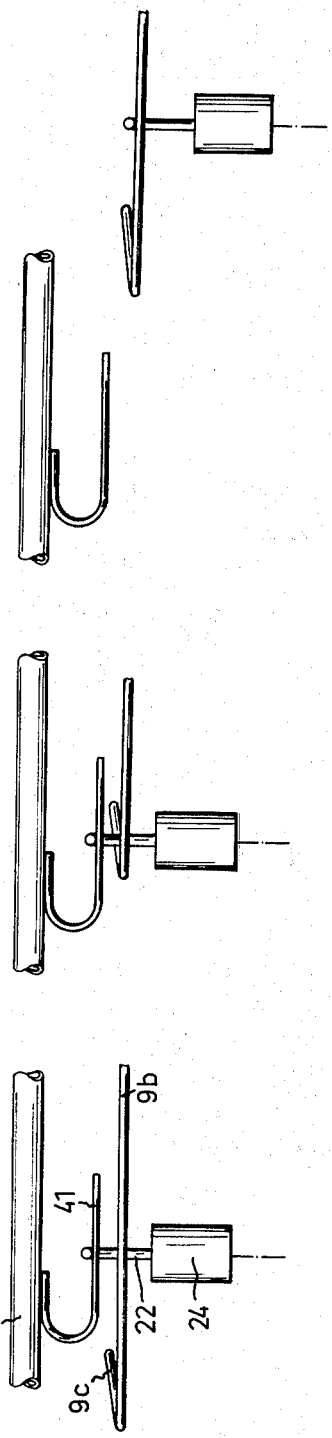

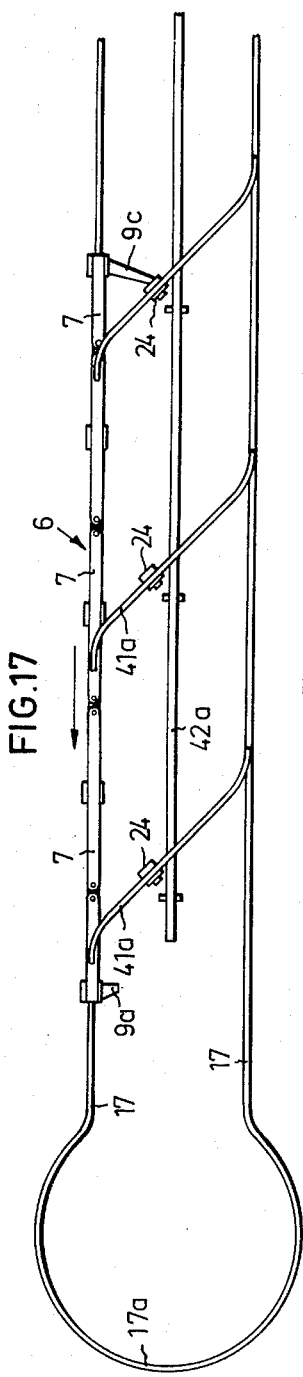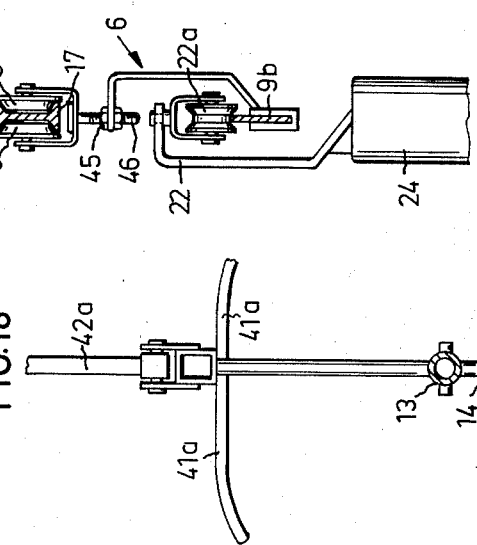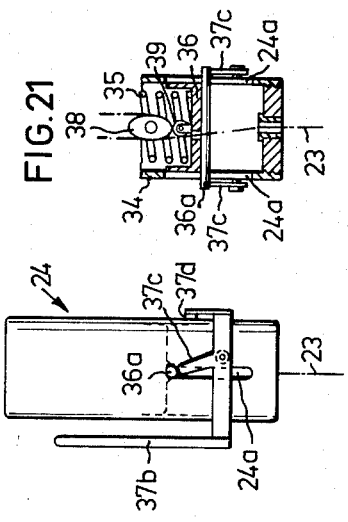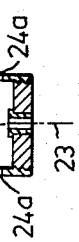

MILKING INSTALLATION FOR COW STABLES

This invention relates to a milking installation for stables with milking stations disposed side by side, preferably in the form of stalls, in which the cows are more or less permanently stalled, said milking installation comprising a number of milking members to be applied to the teats of the cows and connected or connectible to a milk pipe and a vacuum pipe, which milking members are supported by a carriage which is movable along the milking stations and on which the milking members are movable relatively to the carriage.

Different types of installations made to facilitate the milking of cows are previously known. One such type implies a pasture feeding system, in which the cows are driven together in foldings where they enter a rotating disc, on which the milking members are applied and the cows are milked while the disc rotates one revolution. Thereafter the cows are led away one by one.

Systems based on pasture feeding of this kind have several disadvantages, e.g. a lack of sufficiently exact possible control of the feeding and of the state of health of the cattle.

To avoid the disadvantages of pasture feeding it has been suggested to install the cows more or less permanently in stables, and a system based on the installation of the cows in stalls arranged side by side and limited sideways by adjustable beams, has been found especially advantageous. When the cows are to be milked the side limitations of the stalls are adjusted to form a pointed angle with the forward end limit of the stall which maintains the cows in an oblique position in which the udders of the cows are easily accessible for applying the milking members.

When the number of cows and thereby the number of adjacent stalls and milking stations is large, certain difficulties arise in obtaining an effective utilization of the milking installation without simultaneously making the work of the stable staff complicated and ineffective. In known milking installations of the kind above indicated the work consists mainly in displacements between the different milking stations to apply the milking members onto the cows to be milked and to remove the milking members for the milked cows which implies a great amount of work for the staff to perform the milking operation.

The object of the present invention is to produce a milking installation of the kind stated above which without large capital investment can be advantageously used both in smaller and in very large stables and the use of which results in a high efficiency of the milking staff's work.

In its widest aspect the milking installation according to the invention is characterized in that in connection with the carriage there is a guideway comprising one or more essentially rectilinear sections along which the milking members can be moved.

Because of the relative motion between the carriage and the milking members the carriage can now perform a stepwise or continuous displacement between adjacent milking stations while the milking members already applied remain motionless relatively to the cows. The hand-work to be effected at each milking station can thereby be greatly reduced since the installation in practice is so arranged that simultaneously, as the carriage reaches a new milking station, the milking members will move to a position in which they simply and easily can be applied to the teats of the cows and the milking process can be immediately begun. The ineffective walking time of the staff between the different milking stations for fetching the milking members in one station and bring them to a new milking station can thus be essentially reduced or entirely eliminated.

An especially advantageous embodiment is obtained if the milking members are movable along a guideway and if this guideway while moving together with the carriage is movable relatively to the carriage and is endless with at least two rectilinear sections and two end sections passing over end wheels. Thereby the milking members are so movable relative to the carriage that they during their displacement on the portion of the guideway facing the milking stations remain mainly motionless at a milking station while they on the opposite side of the guideway move twice as fast as the carriage.

A milking installation which works best from several points of view is obtained if, according to the invention, the number for milking members and the velocity of the carriage are so adapted to each other that the time for moving the carriage along a number of milking stations corresponding to half the number of milking members and for the connection of the milking members at each of these milking stations corresponds approximately to the average milking time for a cow or slightly exceeds said time.

It is, however, possible to render a device according to the invention still more effective and simultaneously to simplify it so as to permit its economical use even in smaller stables and, if it is used in larger stables, to render it still more advantageous. This is mainly obtained by letting the milking members perform a portion of their movement relative to the carriage while they are disconnected from the milk pipe and vacuum pipes.

Thereby it becomes possible to eliminate all the flexible milk and vacuum hoses which are necessary in the previously described embodiments for connecting the milk and vacuum ducts partaking in the movements of the carriage with a collector tank for the milk. In large stables with a large number of milking stations these ducts must have a great length which renders the installation more complicated. Compared with the above mentioned embodiments of the invention, an embodiment in which the milk and vacuum pipes follow with the movements of the carriage in which the milking members move along an endless path having a portion running parallel with the direction of movement of the carriage and facing the milking stations, and a portion opposite said first portion and equally parallel with the direction of movement of the carriage, and in which a central collector tank for the milk and a source of vacuum e.g. a pump is placed on the carriage, the advantage is obtained that such pipings which are necessary for connecting the movable milk and vacuum pipes with said tank and pump and which must be supported rotatably on the carriage are entirely avoided.

Instead of this the milk and vacuum pipes can now be fixedly mounted relative to the milking stations and the milking members and be arranged in a predetermined position of the carriage to be disconnected from the milk and vacuum pipes and from the teats of the cows.

The disconnecting of the milking members can be obtained by means of valves in the milk and vacuum pipes, in which a change of the position of a valve results in its closure. The closure of the vacuum valve results in a loosening of the teat cups from the teats of the cow, which effect can be utilized in its turn to obtain a lifting of the milking member into a transport position, in which position said members at the end of their transport along the guideway are easily accessible for the milking operator. The impulse for the closure of the valves can be produced in many different manners, e.g. mechanically by abutments cooperating with the suspension means of the milking members or thereby that the hoses of the milking members are stretched in connection with the movement of the carriage relatively to the milking members.

In a preferred embodiment of the invention the carriage supports a relatively fixed moving guideway in the form of a rail or the like on which the milking members are movably suspended. Chains or like means for supporting and transporting the milking members relative to the carriage can thereby be avoided. Instead the guideway, that is the rail, has a portion running essentially parallel with the moving direction of the carriage and having a length essentially corresponding to the length of the carriage.

If one prefers to let the milking members move in a closed path along the carriage, the guideway, that is the rail, according to another embodiment has an essentially rectilinear portion facing the milking stations and an opposite, essentially rectilinear portion, both these portions being connected with each other by curved end portions.

A further simplification can be obtained, if the portion of the guideway, on which the disconnected milking members are to move, is inclined in the direction of motion of the carriage. The milking members will then under the action of gravity move one by one to the forward end of the carriage where the milking operator is stationed and where the milking members are easily accessible to him.

An embodiment of the invention, in which the carriage is provided with an endless guideway, is characterized in that the portion of the guideway, situated nearest the milking stations, is inclined upwards from the forward to the rearward end of the carriage. When the carriage moves along the milking stations with the milking members essentially motionless with regard to the milking stations, the suspending means for the milking members will be successively lifted so that when they are finally disconnected after the milking operation is completed, they reach their highest position and thereafter on the other side of the guideway can roll down and forward to the fore end of the carriage where the milking operator is standing.

Still a further simplification can be obtained if the carriage supports a preferably hook-shaped portion provided for cooperation with a suspending means for the milking members so mounted that a milking member suspended near the carriage at the passage of the hook-shaped portion of the carriage is caught and carried away with the carriage. In this case it is appropriate to form said preferably hook-shaped portion of the carriage as a part, preferably as an end portion of the guideway for the milking members or to mount it immediately adjacent to said guideway.

In this embodiment the milking operator lifts off the suspending means of the milking members from the guideway of the carriage and hangs them up near the path of motion of the guideway. In connection herewith he connects the hoses of the milking members with the milk and vacuum pipes and adapts the teat cups to the cow. The carriage as well as the guideway can thereby be essentially simplified and the carriage can consist of standards having rollers mounted at their upper ends and supporting at their lower ends a sliding track in the form of a number of tube sections preferably hingedly connected to each other. Said slide track can be inclined in the direction of motion of the carriage. The hook-shaped guideway portion at the rear end of the carriage will, when the carriage is moving forward, pick up the suspending member of the milking members, so as to transfer the latter to the guideway, on which, because of its inclination and of the action of gravity, they will move to the forward end of the carriage, where the milking operator is placed. The sliding track at its forward end is preferably provided with a stop member, that is a hook, for the milking members.

This device, onto which the milking members are suspended, can consist of a tube mounted in fixed relation to the stalls adjacent the path of motion of the carriage. Said tube bears a suspending hook in front of each of the milking stations. This tube is mounted in fixed relation to the stalls and might possibly consist of the vacuum or the milk pipe. It is, however, appropriate to make the tube and/or the guideway of the carriage adjustable in height to permit an adaptation of the cooperating parts. The carriage should likewise in the cases where it has an inclined guideway have appropriate adjusting members for the adjustment of the inclination.

As in the previously described embodiments the carriage should preferably consist of several sections hingedly connected to each other, especially in those cases where the milking stations are formed of rows of stalls running parallel to each other. The carriage will then like a snake move along both rows of stalls.

Further characteristics and advantages of the invention will be set forth in the following description of some embodiments thereof with reference to the accompanying drawings. FIG. 1 is a plan view of a milking installation according to the invention in a stable for permanently stabled cows. FIG. 2 is a front view of a portion of the installation according to FIG. 1. FIG. 3 is a plan view of the portion illustrated in FIG. 2 seen from section line 3—3 in FIG. 2. FIG. 4 shows a vertical section along line 4—4 in FIG. 2. FIG. 5 is a plan view of a portion of a modified form of the carriage for a milking installation according to the invention. FIG. 6 is a side view of the carriage illustrated in FIG. 5. FIG. 7 shows a vertical section along line 7—7 in FIG. 6. FIG. 8 shows a vertical section through a spring roller box for the suspension of the milking members of the installation. FIG. 9 and 10 are side views of the spring roller box according to FIG. 8 with the milking members in two different positions. FIG. 11 is a diagrammatic side view of a modified carriage for a milking installation in which the carriage has a single sliding track for the disconnected milking members. FIG. 12 shows a section along line 12—12 in FIG. 11. FIGS. 13 to 15 illustrate the function of how the suspension means for a milking member are picked up by the carriage of a milking station. FIG. 16 is an elevational view showing a milking station at which the forward end of the carriage according to FIG. 11 has just arrived. FIG. 17 shows a plan view of a modified installation according to the invention. FIG. 18 shows an enlarged cross section of the installation of FIG. 17. FIG. 19 is a view similar to FIG. 7 but showing a modified construction. FIGS. 20 and 21 are respectively elevational and fragmentary cross-sectional views similar to FIGS. 8-10 but showing a modified construction.

In the drawings number 1 refers to several adjacent stalls in a stable for permanent keeping of cows. Each stall is limited by side beams 2, which are rotatable about vertical axes 3 from a position in which they form right angles with the forward limit 4 of the stall to an inclined position towards said limit so that the cows in the latter position will be maintained in an oblique position facilitating the adaption of the teat cups of the milking members onto the udders of the cows. Numeral 5 in FIG. 1 designates a fodder-board placed in front of the row of stalls.

A carriage 6 is movable along the row of stalls or milking stations, which carriage consists of a number of hingedly interconnected sections 7, which in the illustrated example are eight in number. Each of said sections serves to support the milking members which consist of teat cups 10 connected by flexible hoses 11, 12, to a milk pipe 13 and to a vacuum pipe 14, respectively. The line 14 is in any suitable known way connected to a source of vacuum pressure and the milk line 13 is also in any suitable known way connected to a milk tank, as by flexible conduits 14' and 13', respectively, of suitable length. Each cluster of milking members has its own pulsator means.

In the embodiment illustrated the carriage 6 is movable along a rail 17 suspended in the roof of the stables. Each of the sections 7 has for this purpose an upper wheel running on said rail 17. Each section has further lower wheels 9 over which chains 18 are running. On these chains are mounted spaced holders 20 for the milking members 10–14. Each section supports further upper wheels 21 over which chains 29 are running which by means of holders 22 support suspending lines 23 for the teat cups 10. The upper holders serve the purpose to support the milking members when the teat cups are removed from the udders of the cows so that the teat cups are not soiled when disconnected. Such a disconnection can in a manner known per se be effected automatically after the end of the milking process by temporarily cutting off the vacuum in the vacuum pipe of the milking member. The suspending lines 23 can for instance cooperate with spring roller boxes 24 which have approximately the same function as the springs of roller blinds. When the teat cups after finishing the milking operation fall off the teats of a cow, they are hoisted by means of the spring boxes 24 to the position illustrated in mixed lines in FIG. 4, in which the risk of soiling during the continued movement to a new milking station is avoided.

The two outermost sections of the carriage support vertical axes 25, 26 for end wheels 27, 28 around which chains 18, 29 are running which form the endless guideway. Since the milking members are moving relatively to the carriage in the manner above indicated, they can during the progressive motion of the carriage along the row of milking stations remain motionless on one side of the guideway while they are moving with twice the speed of the carriage on the other side. When the carriage reaches a new milking station there will always be a new milking member that has been forwarded to a position in which the teat cups simply and easily can be fastened to the teats of a cow standing at the actual milking station.

The average time for milking a cow is approximately 4.5 minutes and the number of sections and therefore the number of milking members as well as the velocity of the carriage are chosen in such a manner that the time necessary to connect half the number of milking members, i.e. those situated on the side of the endless guideway turned towards the stalls, corresponds to the average milking time. When according to the example illustrated the eight milking members have been connected, a time of 4.5 minutes has elapsed and the milking member first connected can be disconnected and upon continued motion of the carriage move along the side of the guideway opposite the milking stations until seven further milking members have been connected, at which moment the first milking member has reached the easily accessible position for renewed connection.

The carriage 6 can be moved manually, e.g. by means of winches 29' or the like or, if desired, be moved along the stalls by means of a motor (not shown). The first section of the carriage can be provided with a seat 30' for the operator, who then rides with the carriage and in sitting position performs the adaption of the teat cups. This embodiment is indicated in FIG. 1.

Different additional means can be mounted at the working station of the operator, e.g. means for preparing one or more cows in one or more of adjacent stalls for the impending milking operation. Shower means 31 can thus be provided for spraying and washing the udders of the cows and a nozzle 32 for blowing warm air for drying the udders.

Depending on the different requirements in different stables a different number of sections 7 can be coupled together to form a carriage 6 of appropriate length.

A member, e.g. a pin 33, can be used to engage the control means of the valves for each of the actual milking members so that the teat cups 10 are released. This member 33 can be provided near the end cylinder 27 at the rear end of the carriage.

According to the embodiment of FIGS. 5–7 the carriage 6 is movable along a rail 17 suspended in the roof of the stable. Each of the sections 7 has for this purpose two upper wheels 8 running on the rail 17. Each section has further a guideway in the form of a rail 9 which can consist of supporting beams or appropriate means. The guideway has a part thereof which runs parallel with the direction of movement of the carriage situated near the milking stations and an opposite part. The guideway is supported by supporting brackets 7b extending obliquely downwards from a central frame beam 7a. As shown in FIG. 6 the guideway is inclined downwards in the direction of motion of the carriage. The supporting members of the milking members which will be described more in detail further on, can thus under the action of gravity move towards the forward end of the carriage where the milking hoses of the milking members are disconnected from the vacuum and milk pipes and the teat cups are released from the udders of the cows.

Further the milking members, which members are connected by the operator sitting at the forward end of the carriage, will successively be hoisted since they remain motionless in the horizontal direction relatively to the milking stations when the carriage with its inclined guideway parts 9 is moving forwards and thereby is lifting them vertically.

When the carriage has moved so far forwards in relation to a milking member that the latter is at the rear end of the carriage where the guideway 9 goes over into a hook-shaped end portion 9a, appropriate member, e.g. the pin member 33, are provided to close a valve in a connection of the vacuum pipe 14, to which the vacuum hose 12 is connected, whereby the teat cups are released from the udder and the hoses 11 and 12 are removed form their respective hose connections. The average time for milking a cow is, as already mentioned, about 4.5 minutes and the number of sections 7 of the carriage 6 and the moving speed of the carriage are adapted in such manner that it takes about the above said time to connect as many milking members as there are on the side of the endless guideway turned towards the milking stations. If the carriage e.g. has eight sections, a time of 4.5 minutes has elapsed until the eight milking members have been connected at which time the first milking member in a manner indicated above is released upon continued movement of the carriage e.g. by motor 30 (FIG. 6) and is disconnected from the milk and vacuum pipes and will move along the part of the guideway turned away from the milking stations which movement by being produced under the action of gravity can be so fast that the milking member in question nearly immediately can be reused for a new connecting operation.

The carriage 6 is driven continuously or stepwise along the stalls by means of a motor 30 (FIG. 6), but can also be moved manually e.g. by means of a winch, a pulling chain or the like.

FIGS. 8–10 show an embodiment of a suspending device for the milking members 10, 11, 12 which device is movable along the guideway 9 and consists of a roller spring box 24 with a suspending member 22 with rollers 22a and a suspension line 23 for the milking member. The spring roller box consists of an outer cylinder 34, within which an inner cylinder 36 is movable under the action of a spring 35. The movements of the inner cylinder under the action of the spring 35 are limited by a stop member 37 with an operating pin 37a passing through the wall of the cylinder 34 to the outside thereof. The suspension line 23 passes through an end wall 34a of the outer cylinder and is wound on a system of pulleys 38, 39 mounted into and between the two cylinders 34, 36. The stop member 37 is operable by a cam 40 or the like on the rear part of the carriage. When the stop member 37 is released the inner cylinder 36 is moved towards the end wall 34a of the outer cylinder which produces the winding in of the line 23 and lifts the milking members into a transport position shown in FIG. 5. In order to fit the teat cups onto the cow after the spring roller box 24 has moved to the forward end of the carriage the milking operator pulls the line 23 out whereby the spring roller box is restored to the position illustrated in FIGS. 8 and 10.

Instead of forming the guideway 9 with an inclination downwards an appropriate driving means can be used to move the spring boxes and the milking members from the rear end of the carriage to its forward end. FIGS. 11 and 12 show diagrammatically a further simplified embodiment of the milking installation in which the sections 7 of the carriage 6 comprise vertical tubes or standards 7c which at their upper end are provided with rollers 8, which like before can move along a rail 17 suspended at the roof of the stables. The standards 7c support at their lower part a sliding track 9b which is inclined downwards in the moving direction of the carriage and which is placed essentially straight below the rail 17. In this embodiment the carriage thus does not support an endless guideway but only a sliding track extending from the forward end of the carriage to its rear end. At the ends the sliding track 9b passes over in hook-shaped portions 9c and 9d, the purpose of which will be explained later on.

When the milking operator, placed at the forward end of the carriage 6 shall adapt the teat cups on a cow at one of the milking stations he lifts the spring roller box 24 from the carriage and hangs the same up on a suspending hook 41 which is fixedly mounted onto a tube 42 running along the path of motion of the carriage. The spring box hangs there during the time of 4.5 minutes necessary for the performance of the milking operation and for the entire carriage to pass the milking station. FIGS. 13 to 15 illustrate how the hook shaped end portion 9c of the sliding track moving together with the carriage grips around the suspending member 22 of the spring roller box 24 so that the latter is disengaged from the suspending hook 41 and falls down onto the inclined portion 9b of the track. While the carriage and said track portion 9b are moving forwards, the spring roller box will slide with an appropriate speed along the track portion to the forward end of the carriage where the milking member connected to the spring roller box will be ready to be used anew. The bent forward end portion 9d of the track serves to stop the movement of the spring roller box relatively to the carriage.

FIGS. 17 to 21 show a modification of the embodiment of FIGS. 11 to 16. The milking installation is here intended for use in a stable with two parallel rows of stalls for which reason the rail 17 suspended in the roof has a bent end portion 17a on which the carriage 6 passes on its travel along the stall rows. The spring boxes 24 of the milking members are adapted for being hung up on suspending hooks 41a of reversed S-shape extending obliquely between the parts of the guideway. These parts are suspended in supporting links 42a which are mounted in the roof and which can be hoisted or lowered. The rear portion of the carriage has a pulling member 9c which transfers the spring roller boxes one by one to the inclined guideway 9 on the carriage 6 where said boxes roll forwards to the fore end of the carriage for renewed utilization. A catch 9d prevents the spring roller boxes from rolling off the carriage. The pulling member 9c serves simultaneously as a catch releaser for the spring roller boxes which, as shown in FIGS. 19 and 20, have a modified form compared with that of FIG. 8. The pulling member 9c actuates the lever 37b whereby the catch member 37c releases an abutment 36a mounted onto the inner cylinder 36 so that the latter can move along a slot 24 and the cylinder 36 thereby can move downwards for winding in the line 23. A locking member 37d permits the correct return to the initial position when the spring box is again hung up on a suspending hook 41a by the milking operator. Since the carriage 6 consists of hingedly interconnected sections it can follow around the bent guideway portions 17a.

The portion of the carriage 6 combined with the guideway 9b is adjustable in height relative to the carriage portion supporting the rollers 8 by means of a screw nut 45, 46.

Several modifications are possible within the scope of the invention as above described and defined in the claims.

What we claim is:

1. A milking installation comprising a milking stable having a line of milking stations for cows arranged side by side, a number of milking members attachable to the cows, an endless flexible milk pipe and an endless flexible vacuum pipe to which said members are connected, said milk pipe and said vacuum pipe being adapted to be connected to a milk tank and a source of vacuum, respectively, a carriage conjointly supporting all said members, means mounting said carriage for movement along the milking stations, the milking members being movable relative to the carriage, and a guideway supported by the carriage and supporting the milk pipe and the vacuum pipe for circulation in an endless path relative to the carriage, said endless path having at least one substantially rectilinear section parallel to said line of milking stalls.

2. A milking installation according to claim 1, characterized in that the guideway comprises at least two rectilinear sections and at least two guideway sections running over end wheels to form an endless guideway which is movable relatively to the carriage.

3. A milking installation according to claim 2 in which the milking members are so movable relatively to the carriage that they during their movement along the side of the guideway facing the milking stations remain essentially motionless relatively to the milking stations while they are moving about twice as fast as the carriage on the opposite side of the guideway, characterized in that the number of milking members and the displacement speed of the carriage are so adapted that the time for the displacement of the carriage along a number of milking stations corresponding to half the number of milking members and for the positioning of the milking members at each of said milking stations is essentially equal to or slightly longer than the average milking time for a cow.

4. A milking installation according to claim 2, characterized in that the carriage consists of a number of sections provided with wheels or rollers over which are running members such as chains which form the guideway and which support supporting members for the milking members.

5. A milking installation according to claim 4, characterized in that the end wheels of the guideway are mounted on the two outermost sections of the carriage.

6. A milking installation according to claim 4, characterized by members maintaining the milking members in a lifted position when they are not applied for milking.

* * * * *